United States Patent
Sarukkai et al.

(10) Patent No.: US 6,728,731 B2
(45) Date of Patent: Apr. 27, 2004

(54) METHOD AND APPARATUS FOR ACCESSING TARGETED, PERSONALIZED VOICE/AUDIO WEB CONTENT THROUGH WIRELESS DEVICES

(75) Inventors: Ramesh R. Sarukkai, Union City, CA (US); Anurag Mendhekar, Sunnyvale, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 0 days.

(21) Appl. No.: 09/858,853

(22) Filed: May 15, 2001

(65) Prior Publication Data

US 2002/0174133 A1 Nov. 21, 2002

(51) Int. Cl.[7] ................................................. G06F 7/00
(52) U.S. Cl. .................... 707/104.1; 707/3; 379/201
(58) Field of Search ........................ 707/3, 104.1, 100; 379/67.1, 201, 211

(56) References Cited

U.S. PATENT DOCUMENTS

| | | | |
|---|---|---|---|
| 5,915,001 A | * | 6/1999 | Uppaluru ................ 379/88.22 |
| 6,131,121 A | | 10/2000 | Mattaway et al. |
| 6,192,123 B1 | * | 2/2001 | Grunsted et al. ........ 379/93.17 |
| 6,215,863 B1 | * | 4/2001 | Bennett, III et al. ........ 379/201 |
| 6,327,594 B1 | | 12/2001 | Van Huben et al. |
| 6,385,596 B1 | | 5/2002 | Wiser et al. |
| 6,405,033 B1 | * | 6/2002 | Kennedy, III et al. ...... 455/414 |

* cited by examiner

*Primary Examiner*—Sam Rimell
(74) *Attorney, Agent, or Firm*—Townsend and Townsend and Crew LLP

(57) ABSTRACT

A wireless web system allows users to navigate web pages that include links to audio content where the pages are provided over a data connection and the audio content is provided over a voice connection. An audio content reference generator generates a reference to a portion of static audio content and that audio content reference is provided to the user's wireless web client as a link on a wireless web page, or other page retrieved by the wireless web device over the data connection. The audio content reference and a telephone number of an audio server form the link on the page, so that when a user selects that link, the wireless device establishes a voice connection to the audio server using the telephone number and then provides the audio server with the audio content reference so that the user hears the specifically referenced audio content over the voice channel.

17 Claims, 2 Drawing Sheets

METHOD AND APPARATUS FOR ACCESSING TARGETED, PERSONALIZED VOICE/AUDIO WEB CONTENT THROUGH WIRELESS DEVICES

FIELD OF THE INVENTION

The present invention relates to the audio content systems. More specifically, one embodiment of the invention provides access to personalized audio content through a device with browsing capabilities.

BACKGROUND OF THE INVENTION

Initially, cellular telephones were client devices that only connected to a voice network. Thus, a user of a cellular telephone ("cell phone", for short) could use the device to connect to a voice network, such as the public switched telephone network ("PSTN"), to make a circuit connection between the cell phone and another telephone or telephone device. Once the connection was made the two devices would communicate using voice band signals. Where the two devices were in use by people having conversations, the voice band signals would simply be the electrical representation of the conversants speaking. In other cases, one of the devices was a machine, such as a computing device, a voice mail system, and automated response unit ("ARU", also often referred to as a "touch-tone (TM) response system"), or voice response unit ("VRU") responsive to voice inputs.

Recently, with the increasing use of the Internet, and more specifically the hyperlinked collection of documents (often referred to as "pages") known as "the World Wide Web" ("WWW" or "the Web", for short), newer cell phones often include a Web client (often called a "browser") that provides the user of the cell phone access to the Web. In the case of wireless access to the Web, of which a cell phone is but one example, there may be some limits on the data network usage, such as a limited display and a limited bandwidth allocated to each device. Thus, in the common usage of the terms, a cell phone user might be said to be using the cell phone to browse Web pages on the wireless web.

As used herein, "wireless web" refers to the Web generally, but with the understanding that some modifications might be made to some of the documents in the collection so that the documents are more easily handled in the wireless environment. Examples of modifications include limitations on the class or number of documents that are accessible via the wireless device, modifications to reduce the number of bits required the represent the document, or modifications to make the document more readable on a smaller display typical of a wireless access device. One simplified approach to wireless web pages is to take existing Web pages containing high-bandwidth components such as image and audio content and omitting all but the text content of the pages. However, it should be understood that such modifications are not a requirement of a set of documents available over a wireless web.

The Internet is a packet-switched network, whereas the PSTN is a circuit switched network. Nonetheless, newer cell phones can provide both types of connections, as the communications channel between the cell phone and the stationary cell transceiver that is the cell phone's point of contact is a digital channel. Thus, voice is digitized in the cell phone and is transmitted along with any data packet traffic along the channel between the cell phone and the transceiver. How the data and voice are separated at the transceiver, or further into the cellular telephone service network, is well known and need not be further described herein. From the perspective of the cell phone, there is a voice network into which a voice circuit can be established and a data network that will accept data packets and return data packets directed at the cell phone. Unless otherwise indicated, it should be understood that references herein to cell phones might also apply to any other device that provides wireless access to a voice network and to a data network.

Typically, the voice connection and the data connection in a wireless access device are separate, such that both connections cannot be used at once, either because of bandwidth constraints or because a wireless service provider might choose, for billing or other reasons, not to allow simultaneous use of both connections. However, many devices have a capability to switch a user from a data connection to a voice connection more or less seamlessly. For example, with some cell phones, the user can use a wireless browser to navigate among wireless web pages.

Navigation from page to page is typically done using links, where one page contains links to other pages and the user "moves" from the one page to another page by selecting (e.g., clicking on) on the one page a link to the other page. Some pages may have links not to other pages, but to a voice channel. Instead of the link containing a uniform reference locator ("URL") referencing another page, the link contains a reference to a telephone number. An example of where this might be useful is where the browser aspect of the cell phone is used to find a telephone number and then dial that telephone number. If a set of wireless web pages were set up to present restaurant choices, for example, the pages might include a starting page that leads to a tree of choices that a user could navigate down to reach a leaf page of the tree where the leaf page is for a specific restaurant. If that leaf page contained a link that included a telephone number, the user could just select the link and be connected to the selected restaurant.

Since the wireless device does not typically keep both the data connection and the voice connection open at the same time, the wireless device would typically have storage that would store the telephone number from the link. To effect this, once the user selects a link that refers to a desired voice connection (i.e., a telephone number of the desired called party), the wireless device stores the telephone number, closes the data connection, and then sets up a voice connection using the stored telephone number. From the user's perspective, the user would use the wireless device to navigate a menu of pages and select a party to call, and then be connected, via a voice connection, to the called party referenced in the link. At that point, the voice connection would be active and the data connection would not be, however it should be understood that the system could operate similarly in a wireless network that allowed simultaneous use of the data and voice connections.

Some cellular telephone service providers allow for customization, whereby the user can program their wireless device to speed dial telephone numbers and additional digits that are interpreted by a device that answers the call, such as the user's voice mail system. Some cellular telephone service providers also allow for customization of the wireless web pages accessible to the user. For example, a user might set up pages containing links to commonly used telephone numbers of that user.

SUMMARY OF THE INVENTION

In a wireless web system according to one embodiment of the present invention, users navigate web pages that include links to audio content where the pages are provided over a data connection and the audio content is provided over a voice connection. In a specific implementation, an audio content reference generator generates a reference to a portion of static audio content and that audio content reference is provided to the user's wireless web client in the form of a link on a wireless web page, or other page retrieved by the wireless web device over the data connection. The audio content reference and a telephone number of an audio server form the link on the wireless web page, so that when a user selects that link, the wireless device establishes a voice connection to the audio server using the telephone number and then provides the audio server with the audio content reference so that the user hears the specifically referenced audio content over the voice channel.

The audio content reference can be provided to the audio server in many different ways. For example, the audio content reference might be provided to the telephone network as an extension and the audio server might have caller-ID capability that would receive an apparent extension number from the telephone company, with the audio server knowing that a received caller-ID extension should be interpreted as an audio content reference. In another approach, the calling wireless device might dial the telephone number, wait for the voice circuit connection to be fully established and then transmit the audio content reference as a series of tones to an audio server that is programmed to listen for tones when a connection is established and the interpret those tones as an audio content reference. In a third approach, the audio content reference may be stored on the server side and be associated with a device identifier when the user browses to the page that initiates the telephony call. In this situation, the telephony system uses the device identifier and the stored server side information to directly associate the audio content reference with the incoming call.

The actual audio content provided by the audio content server in response to a reference could be of several forms. One form is static content, such as a recording of movie times, or connecting the user directly to voice menus deep within a voice menu structure without the user having to manually navigate the voice menu structure. Another form is dynamic content, such as an audio listing of the user's new voice mail messages. Yet another form is interactive content, where the particular audio played for the user depends on further inputs provided by the user. Still another form of content is live content. An example of live content might be where the audio content reference is interpreted by the audio server as a request to connect the caller with an internal voice connection, as might be used where the user navigates a menu of help pages and selects a link representing a particular technical problem, resulting in the user's wireless device dialing a telephone number for a help desk audio server that then interprets the provided audio content reference as a request to route the call to a system or person that can handle the help request.

A further understanding of the nature and the advantages of the inventions disclosed herein may be realized by reference of the remaining portions of the specification and the attached drawings.

DESCRIPTION OF THE SPECIFIC EMBODIMENTS

The wireless web system described herein allows a user to navigate a data network and use a link to audio content provided over the data network to access audio content over a voice network. The audio content can be static content, dynamic content, interactive content, live content or another form of audio content. The audio content might include audio content alerts (voice mail, email, events, calendar alerts), information in audio form, music/radio on demand, a routed telephone call, etc.

Using the wireless web system, a user can access audio content without necessarily navigating an audio menu. For example, in order for a user to access a certain voice mail, a user may have to dial into the voice mail, enter a password, and pass through various voice prompts to receive the specified voice mail. However, according to one embodiment of this invention, a user may select a link to that specified voice mail and listen to the voice mail without taking any further steps.

Additionally, some audio content can be dynamic and vary depending on the state of a system. For example, a user may want to access the state in a voicemail system of new messages. A user may select a link to the new messages state and be provided with the new messages in the system without any further steps. In addition, a user may be provided with a prompt that precedes the audio content state. For example, the audio content link may bring the user directly to the new messages voice prompt. The user would then be able to choose between the options given by the voice prompt.

Figure 1:
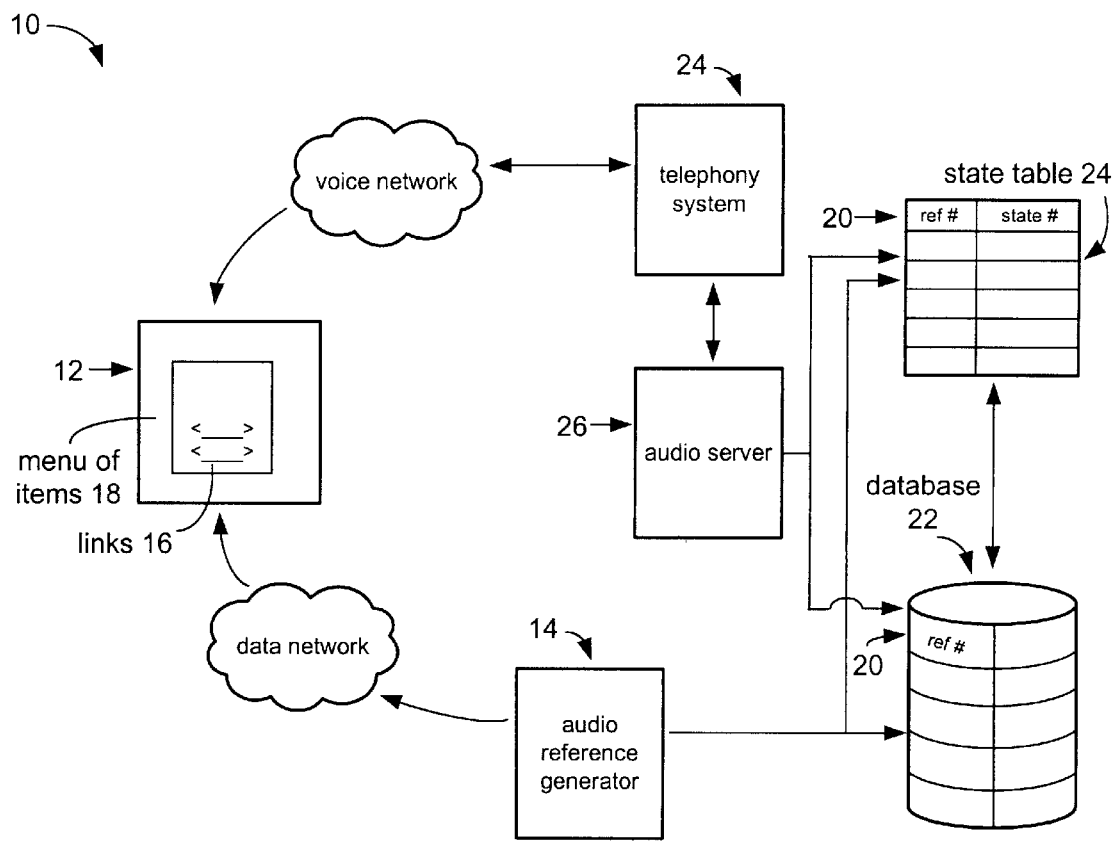
FIG. 1 is a block diagram of a wireless web system according to one embodiment of the present invention.

FIG. 1 shows a system 10 used to access personal audio/voice content according to one embodiment of the invention. In system 10, device 12 is designed to receive digital content over a data connection from audio reference generator 14 and connect to telephony platform 24 over a voice network.

Device 12 can be any device that has audio/voice capabilities and can browse text and/or graphics. In a specific embodiment, device 12 can be enabled to receive digital content over a data channel and receive audio/voice content over a voice channel. Some examples of devices include mobile phones, personal computers, hand-held computers, personal digital assistants, etc.

Audio reference generator 14 can be any device capable of generating a menu of items 18 containing audio content links 16. Each audio content link 16 is preferably associated with a telephone number and audio content reference 20. However, in a specific embodiment, link 16 can contain just an audio content reference 20. For example, the menu of items 18 can be associated with one telephone number and each link 16 can contain just an audio content reference. Additionally, a group of menu items can be associated with one telephone number and another group of menu items associated with another telephone number. It is also understood that the number of groups is unlimited. In all cases, if a user selects a link in the menu of items 18, the telephone number associated with the group of menu items 18 is used with the audio content reference 20 associated with the specific link 16. In this way, a link will only have to contain an audio content reference 20. Additionally, in a specific embodiment, a device can be programmed to dial a telephony system and transmit the audio content reference.

Menu of items 18 can include a list of selectable links 16 that are navigable by the user of the device. Additionally, the menu can be multi-tiered in that a user could select a link 16 and be presented with a new list of links related to the selected link. For example, in a specific embodiment, a user could have both a saved messages and new messages section. When the saved messages link is selected, all the saved messages would appear as links on the user's device. Furthermore, the user's new messages link would provide links to all the new messages when selected. Therefore, in one embodiment of a menu of items 18, a user can be sent a document that includes one or more links and can also be multi-tiered. In a specific embodiment, the menu of items can include HDML ("Hand Held Markup Language"), HTML (HyperText Markup Language), or Javascript documents. However, any document capable of providing selectable links can be used.

Once the audio content reference 20 is generated and associated with the audio content link, the reference can then be stored in a database with the associated audio content referenced by the link. In a specific embodiment, an audio content reference can reference a specific audio content and be stored in a database 22. In this case, each entry of database 22 would contain an audio content reference and the associated specific audio content. For example, an entry could include an audio content reference that references a specific voicemail.

Additionally, in an alternative specific embodiment, an audio content reference can reference a state of the system and be stored in state table database 24. In this case, an entry would include an audio content reference and the associated audio content in the state of the system. Additionally, an entry could include an audio content reference and a referencing system pointing to the audio content associated with the state of the system. For example, an audio content reference could represent all the new messages in a state of the system. Accordingly, the entry in the database could include all the new messages or include references to all the new messages. Preferably, if references to the new messages were included, the references would be the specific audio content references for each new message. Therefore, a central database can be maintained containing all possible audio content. The state table can then reference and retrieve the referenced messages from the central database. Also, users can customize the state table to include any audio content from the database of audio content references. The user can include selected audio content an entry in the state table and only the audio content references need to be stored. It is also recognized that the state table database 24 and database 22 can be combined into one database or be maintained in multiple databases.

Device 12 can be connected through a voice network to telephony system 24. Preferably, a connection through a PSTN (Public Switched Telephone Network) or VOIP (Voice Over IP) network is made. In a specific embodiment, telephony system 24 can be the Yahoo! Inc. Voice Access Telephony Platform. However, any system that can receive an audio content reference sent through the voice network can be used.

In one embodiment, audio content reference 20 can be transmitted to telephony system 24 as an extension with the telephone number. In this case, if caller-ID were available, the extension would be included in the caller identification. For example, if the telephone number is "18006992466" and audio content reference is "12345", caller identification would read in the number "1800699246612345". Therefore, telephony system 24 can then read the telephone number and extension from the caller identification.

In another embodiment, audio content reference 20 can be read in by doing a digit collect. In this embodiment, audio content reference 20 would be collected by doing a digit collect at the time the call is connected. In an alternative embodiment, device 12 can connect to telephony system 24 and wait for a signal indicating that audio content reference 20 should be transmitted. Once system 24 sends the signal, audio content reference 20 can be sent and digit collected. Additionally, in another alternative embodiment, system 24 could be programmed to listen for tones after a connection is made. The audio content reference 20 can then be sent as tones to the system 24. Thus, a system can collect the reference without revealing the reference in a caller identification scheme. One potential problem with caller identification is an extension would be collected when the phone number is dialed because the extension is added to the end of the telephone number. Consequently, a sensitive or confidential extension could be collected by a caller identification device. However, sensitive or confidential references can be protected by not including the reference at the end of the telephone number.

The telephone number can also be used to identify the user if caller identification is available. The telephone number can be matched to a user database to determine a userID of the user. In this case, the system can be customized to a user's preferences. Another possible way a caller can be identified is when a user has signed into the Yahoo! Mobile service by entering a previously setup YahooID and password. Once signed in, the caller can be identified by matching the caller identification with a user database to determine the YahooID or userID of the user. Now, personal information of the user can be presented using the YahooID. Other ways to identify a caller include matching the unique ID of the device with a user database to identify a user. Additionally, any other relevant information, such as the location of the caller, can also be used to present specific audio content to the user. For example, the location of a caller could be used to generate a requested weather report from the caller's location The audio content reference 20 may also be stored on the server side and be associated with a device identifier when the user browses to the page that initiates the telephony call. Examples of device identifiers are the telephone number of the device, the userID or YahooID, uniqueID of the device, etc. In this situation, the system 24 uses the device identifier and the stored server side information to directly associate the audio content reference with the incoming call.

Audio server 26 can be any server configured to retrieve content from a database. In a specific embodiment, audio server 26 can receive audio content reference 20, retrieve the audio content associated with that reference, and return the audio content to telephony system 24. Because the desired audio content has been stored in a database with the audio content reference transmitted by device 12, audio server 26 can retrieve the audio content with just the audio content reference. The audio server does not have to communicate with any other components of the system other than the databases containing the audio content.

Figure 2:
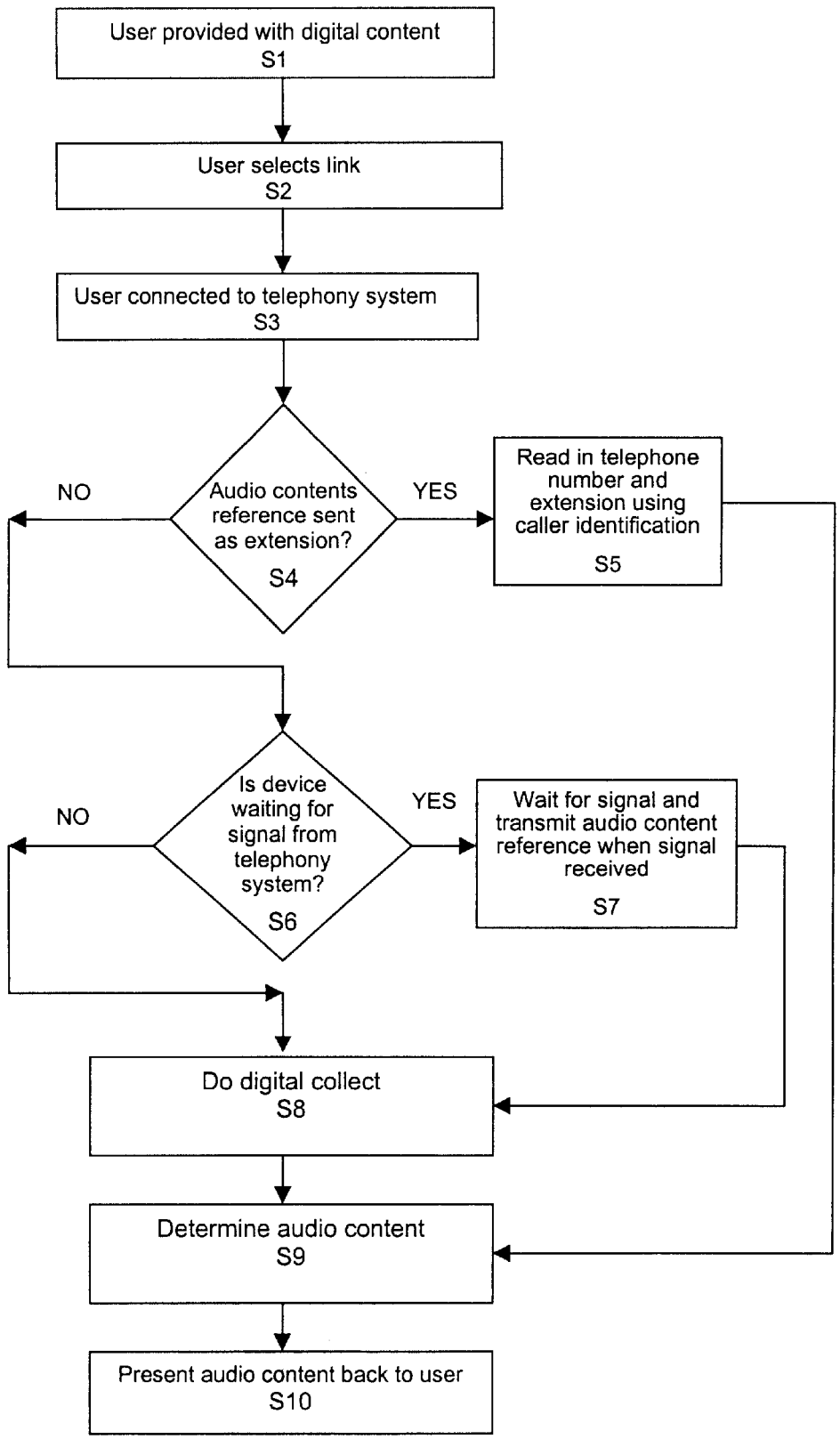
FIG. 2 is a flowchart of a process used to provide audio content to a device user according to one embodiment of the present invention.

Referring now to FIG. 2, a flow chart shows one series of steps, labeled S1, S2, etc., in the order most likely to be carried out for the method of retrieving personalized, targeted audio content. In step S1, device 12 can be provided digital content over a data connection to the user. In this step, audio reference generator 14 can produce a document containing a link or a plurality of links for that user to click on or select.

In step S2, the user selects a link corresponding to the desired audio content. The selection of the link makes a call to the telephony system 24 and connects device 12 to the telephony system (S3). If the audio content reference was sent as an extension on the end of the telephone number (S4), caller identification can collect the telephone number and extension (S5). The process would then proceed to step (S9). However, if the audio content reference was not sent as an extension, device 12 could be waiting for a signal from the telephony system to transmit the audio content reference (S6). In this case, device 12 would wait for the signal and transmit the audio content reference when the signal is received (S7). If the audio content reference were transmitted when device 12 was connected to telephony system 24, the reference would be read in by a digit collect (S8). The appropriate audio content is then retrieved (S9) and presented back to the user (S10).

The above description is illustrative and not restrictive. Many variations of the invention will become apparent to those who are skilled in the art upon review of this disclosure. For example, system 10 can be a wire line system where device 12 is connected to telephony system 24 and audio reference generator 14 through a modem/DSL connection. The only requirement is that device 12 be capable of connecting through a data/voice line. The scope of the invention should, therefore, be determined not with reference to the above description, but instead should be determined with reference to the appended claims along with their full scope of equivalence.

What is claimed is:

1. A system for referencing audio content in hyperlinked web documents comprising:
    an audio content menu of audio content links, wherein an audio content link includes a telephone number and an audio content reference;
    a device including logic to receive the audio content menu over a data channel and transmit the telephone number and the audio content reference associated with the audio content link over a voice channel;
    a telephony system configured to receive the transmitted telephone number and audio content reference from the device; and
    an audio server configured to receive the audio content reference from the telephony system and determine a stored audio record associated with the audio content reference.

2. The system of claim wherein the audio content reference comprises an extension at the end of the telephone number.

3. The system of claim 1, wherein the audio content comprises voicemail, email, events and music or radio on demand.

4. The system of claim 1, wherein the audio content comprises a state of a system.

5. The system of claim 1, further comprising a database, wherein the database includes a database reference to the received audio content reference, wherein the database reference corresponds to audio content.

6. The system of claim 1, wherein the audio server is configured to retrieve the audio content from the database using the database reference.

7. The system of claim 1, wherein a state of a system is used to determine audio content associated with the audio content reference.

8. The system of claim 1, wherein the telephony system is configured to send the determined audio content to the device.

9. The system of claim 1, wherein the audio content reference comprises a telephone number, wherein the telephone number is used to connect to the telephony system.

10. A device for accessing audio content from an audio content server through a telephony system, the device comprising:
    an audio content menu including one or more audio content link, each link comprising a telephone number and an audio content reference, each audio content reference corresponding to audio content;
    a receiver to receive the audio content menu over a data channel;
    an input to receive a selection of an audio content link in the one or more audio content links; and
    a transmitter configured to send the selected audio content reference to the telephony system over a voice channel, wherein the telephony system sends the audio content reference to the an audio server, wherein the audio server an determines audio content record corresponding to the audio content reference.

11. The device of claim 10, further comprising an audio receiver configured to receive the determined audio content.

12. The device of claim 10, wherein the audio content reference comprises a telephone number, the transmitter configured to use the telephone number to connect to the telephony system.

13. A telephony system for referencing one or more audio content links for a device, the system comprising:
    a data channel system configured to send a menu that includes the one or more audio content links to the device over a data channel, each link including a telephone number and an audio content reference
    a voice channel system configured to establish a connection with the device and receive an audio content link in the one or more audio content links from the device over the 7connection, wherein the audio content link is received from the device over a voice channel; and
    an audio server configured to receive the audio content reference from the voice channel system and to determine a record of audio content that corresponds to the received audio content reference.

14. The system of claim 13, further comprising a database that includes one or more references, wherein the one or more references correspond to the one or more audio content links, wherein a reference in the one or more references is associated with audio content.

15. The system of claim 13, wherein the data channel system is configured to generate the audio content menu using one or more references to audio content that is stored.

16. The system of claim 13, wherein the voice channel system is configured to establish the initial connection through at least one of a public switched telephone network (PSTN) and a voice over Internet Protocol (VoIP) network.

17. The system of claim 13, wherein the voice channel system is configured to send audio content corresponding to the reference to the device.

* * * * *